United States Patent [19]

Van Auken

[11] 3,720,785

[45] March 13, 1973

[54] RECORDING SYSTEM AND METHOD FOR COPYING MACHINE

[75] Inventor: John A. Van Auken, Miami Beach, Fla.

[73] Assignee: Saxon Industries, Inc., New York, N.Y.

[22] Filed: Feb. 25, 1971

[21] Appl. No.: 118,838

[52] U.S. Cl........178/6.6 A, 101/DIG. 13, 346/74 ES, 346/76 L

[51] Int. Cl......G03g 15/04, G03g 15/10, G03g 15/16

[58] Field of Search............178/6.6 A, 6.6 TP, 6.7 R; 346/76 L, 74 ES; 250/49.5 GC, 49.5 ZC; 101/DIG. 13

[56] References Cited

UNITED STATES PATENTS

| | | | |
|---|---|---|---|
| 3,506,779 | 4/1970 | Brown | 346/76 L |
| 2,576,047 | 11/1951 | Schaffert | 250/49.5 ZC |
| 3,461,229 | 8/1969 | Oppenheimer | 178/6.7 R |
| 3,248,216 | 4/1966 | Weigl | 346/74 ES |
| 2,912,586 | 11/1959 | Gundlach | 250/49.5 ZC |
| 3,091,767 | 5/1963 | Kinsella | 346/74 ES |

*Primary Examiner*—Howard W. Britton
*Attorney*—Amster & Rothstein

[57] ABSTRACT

A high density, high repetition rate recording system including a laser, a high DC voltage supply, and a recording medium. The system further includes modulation and/or directional-controlling means for controlling the laser output in response to signals received from an intelligence-bearing original. The recording medium, upon which the intelligence of the original is received, is described to be an electrostatic copying machine paper having a substrate and a conductive coating. The method of the present invention includes the steps of vaporizing the coating in selected areas by use of a controlled laser beam, applying a corona charge to the recording medium such that the medium is rendered charged and toner-receptive only in the areas vaporized by the laser beam and applying toner to the recording medium.

9 Claims, 8 Drawing Figures

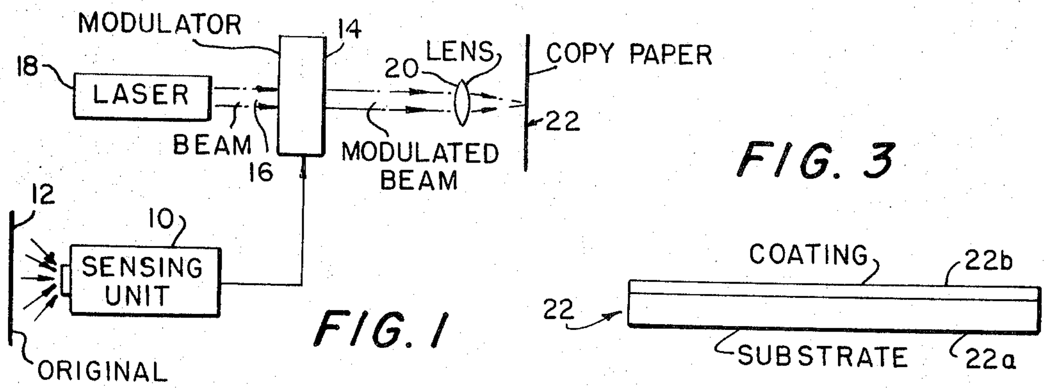
FIG. 1, FIG. 3
FIG. 5
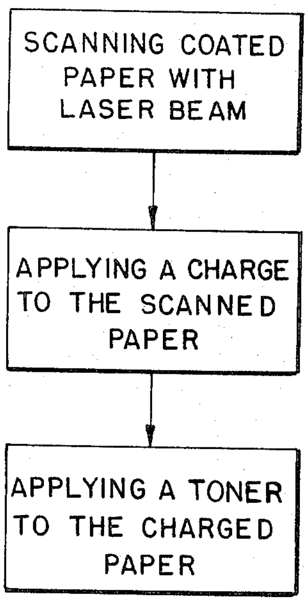
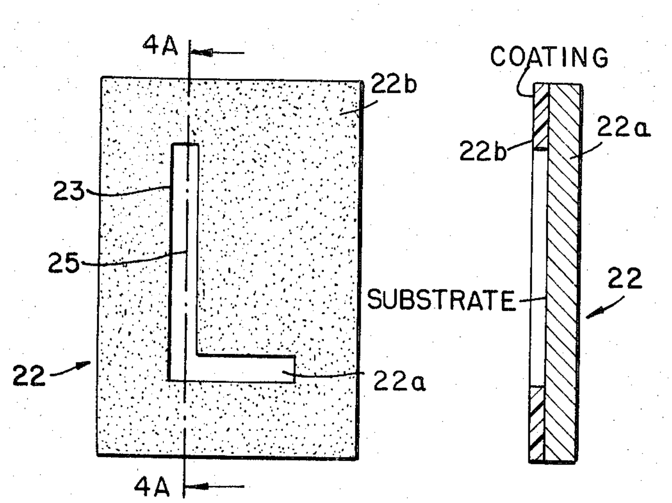
FIG. 4, FIG. 4A
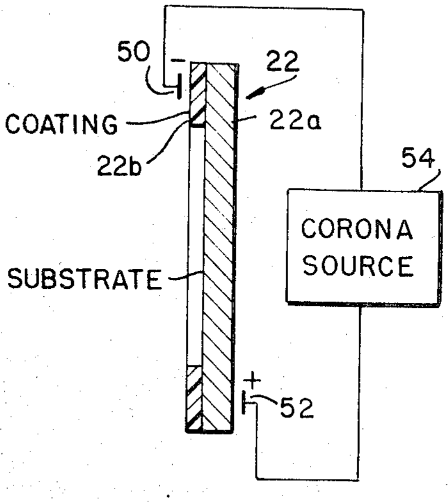
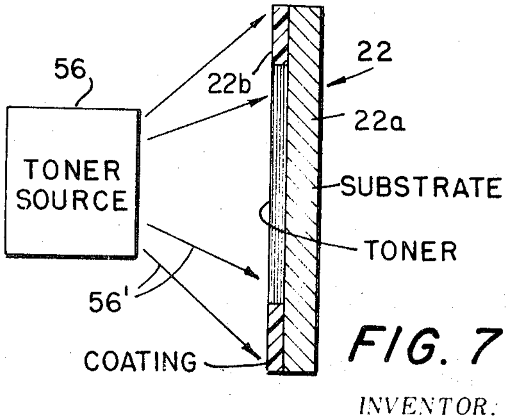
FIG. 7
FIG. 6
INVENTOR:
JOHN A. VAN AUKEN
BY Amster & Rothstein
ATTORNEYS INVENTOR.
JOHN A. VAN AUKEN
BY Amster & Rothstein
ATTORNEYS

RECORDING SYSTEM AND METHOD FOR COPYING MACHINE

This invention relates generally to recording systems and methods and more specifically to a recording system and method for use particularly in a copying machine.

Recording systems including means for reproducing intelligence by use of an electrostatic effect are well known in the prior art. Such systems provide a pair of corona shields or the like between which the recording medium passes during the recording process. The recording medium typically includes a base paper with photoconductive zinc oxide particles dispersed in a resin coating for the paper, so that an electric charge is applied by the shields to the front and back surfaces of the coating. When light subsequently impinges upon the selected areas of the front face of the coating (such light is reflected from non-indicia-bearing areas of the original), such selected areas are rendered conductive (the charge is removed). Toner particles will then adhere only to the non-selected areas.

As an example of such operation, if a negative shield is located adjacent to the zinc oxide photoconductive coating of a recording medium and a positive shield is located adjacent to the opposite surface of the medium, a uniform positive charge is applied to the surface of the coating which is in contact with the substrate of the medium and a uniform negative charge is applied to the exposed surface of the coating. When light subsequently strikes the coating, the light-exposed zinc oxide particles are rendered conductive, thus neutralizing the negative and positive charges in the areas impinged upon by the light. Therefore, the light reflecting from lighter areas of the original is used to light-expose corresponding areas of the coated copy paper and the lack of light reflection from the darker areas of the original enables the retention, in corresponding areas of the copy, of a negative charge on the coating of the copy. Subsequent immersion of the copy paper in a developer solution of charged toner particles causes the toner particles to adhere to the still-negatively charged areas of the coating.

To enhance the repetition rates during the recording process and the density of intelligence that may be recorded in such systems, the present invention contemplates the use of a novel recording system and a method for obtaining increased accuracy and high definition results with less cost and more efficiency. It is also a particular advantage of the present invention to provide a system enabling the use of conventional electrostatic copying machine paper.

The principal object of the present invention is thus to provide a system for recording to produce accurate and highly defined recordings; a further object is to provide a system enabling the use of recording components less costly and more efficient than those presently available; and a still further object is to provide a recording medium and recording method by which the use of a laser light source provides the capability for higher repetition rates and increased density of information storage in a simple yet reliable manner.

These and other objects are accomplished in accordance with an illustrative embodiment of the present invention featuring a recording system comprising a recording medium, a source of laser energy, means for directing or otherwise controlling the output beam from the laser source to selected areas of the medium in response to signals generated in accordance with darker information on an original document and a high dc voltage supply for charging the recording medium to render it selectively receptive to toner or ink. The medium is conductively-coated copying machine paper which includes a substrate and a coating. The method of the present invention includes the steps of vaporizing the coating in selected areas by use of a controlled laser beam, applying a corona charge to the recording medium such that the medium is rendered toner receptive in the areas vaporized by the laser beam and applying toner to the recording medium, the toner adhering to the charged substrate, which is not conductive (a dielectric) in the areas where the coating was vaporized.

The above brief description as well as further objects, features, and advantages of the present invention will be more fully appreciated by reference to the following detailed description of the presently preferred embodiment thereof, taken in conjunction with the appended drawings, wherein:

FIG. 1 is a schematic representation of a system useful in the practice of the present invention;

FIG. 3 is an edge view of a recording medium according to the present invention;

FIG. 4 is a top view of a recording medium useful in the practice of the present invention;

FIG. 4A is a side-sectional view of the recording medium of FIG. 4;

FIG. 5 is a diagrammatic representation of a method according to the present invention;

FIG. 6 is a schematic representation of a recording medium and a source of corona charge useful therewith for practicing the method of FIG. 5; and FIG. 7 is a schematic representation of a recording medium and a toner source useful in the practice of the method of FIG. 5.

Figure 2:
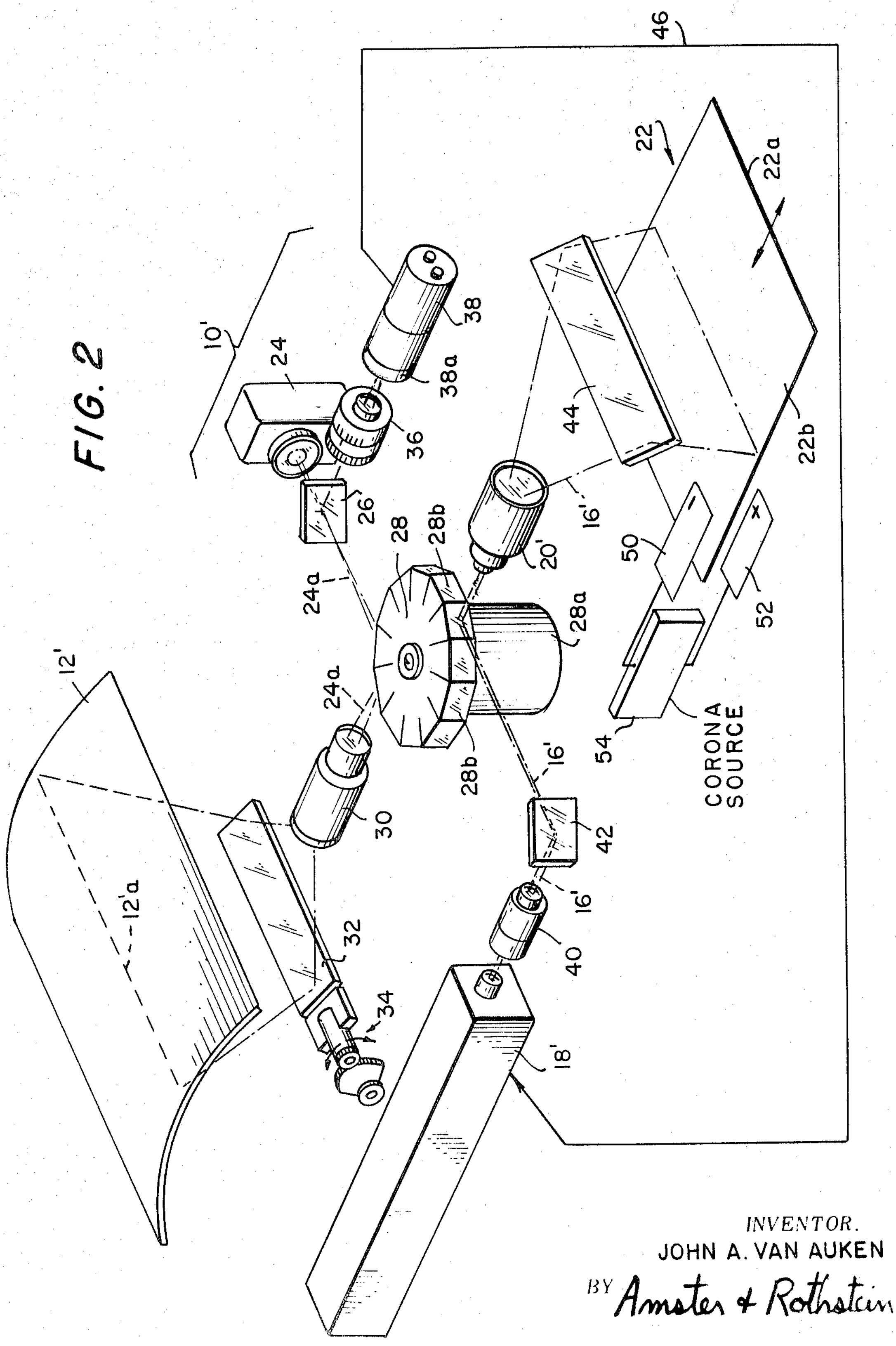
FIG. 2 is a schematic representation of the system according to FIG. 1 but more specific as to the elements of the system usable in a copying machine.

Referring to the drawings and particularly FIG. 1 thereof, a system according to the present invention is shown as including a sensing circuit 10 for sensing the information on an intelligence-bearing original document 12, or from any information source, for transmission of such information by means of a signal to modulator 14. The modulator 14 is associated with or placed in the path of beam 16 from a laser device 18 of conventional design. Instead of a modulator 14, the system of FIG. 1 can include other means for directing or controlling the beam 16 in accordance with the original information, such other means being well known in the art. The laser may be of the Q-switched yttrium-aluminum-garnet type or of the $CO_2$ gas type or any other type providing an output of continuous wave or high repetition rate pulses at a chosen wavelength.

The laser beam 16 after being modulated by modulator 14, or directed by a suitable directional device, propagates to a lens 20 for convergence and focusing to an exposure location through which the copy paper 22 moves. The darker segments of the information are thereby received by the copy paper 22 so that it will have comparable information to that of the original document 12.

The copy paper 22 is of the structure shown specifically in FIG. 3 and includes substrate 22*a* with at least one surface coated with a suitable conductive coating 22*b*. It is important that the substrate 22*a* and the coating 22*b* be of a composition such that toner spreading between the substrate and coating or within the substrate is at a minimum for purposes of sharpness and definition. The substrate 22*a* may be of any of the various types of paper commonly found commercially and of suitable tensile and shear strength for copying machine use. Furthermore, the substrate is substantially reflective on non-absorbent to the chosen wavelength of the laser beam for reasons that will become apparent in the following description. The coating 22*b* for use with the substrate 22*a* should be formed of a substance that provides minimum heat transfer to the substrate and should be non-irritant because of its vaporization and any resultant residue in a consumer environment. Furthermore, the coating 22*b* may include a common salt or similar inorganic water soluble ionic compound in a starch or gum binder applied from an aqueous solution. Zinc oxide coatings are useful also.

By use of the above construction and composition the copy paper 22 and the laser 18 enable the coating 22*b* to be vaporized by a suitably focused and directed laser beam in selected areas controlled by the sensing unit 10 and modulator 14 in accordance with the lighter and darker segments of the information intended for recording thereon, the darker segments actually being recorded.

The words "vaporized," "vaporize" or any form thereof, as used herein, are intended to define processes of removal, partial or total, by volatilization or otherwise of the coating 22*b*, such that the substrate 22*a* is exposed and its electrical properties thereby made operable. These meanings are in addition to the usual meanings given to the words.

Also, the words "ink" and "toner" are used with the former as generic and the latter as specific. The word "ink" is intended to include typically a suspension of pigment particles such as carbon in a solvent as well as a variety of commercially available and specially prepared inks. Also, it has been found that commercially available electrostatic toner is particularly suitable for the system as described herein.

More specifically, an important use of the system and method of the present invention is in conjunction with a copying machine. A recording system for such use is shown particularly in FIG. 2 as including a sensing apparatus 10′ having a light source 24 which may or may not be a laser light source, a two-way mirror 26 or the like for refracting light from the light source 24 and for reflecting light as well, a focusing lens 36 to which reflected light from the two-way mirror 26 is propagated, and a light sensor 38 of the type including a pinhole mask 38*a*. All of the elements of the sensing unit 10′ are conventional in design and may be varied according to the parameters of the system used.

Refracted light through two-way mirror 26 is propagated toward a multi-sided mirror 28 rotating by means of its rotor means 28*a*, such that a sensing light beam 24*a* is reflected from one of the mirror surfaces 28*b*, toward a flat field scan lens 30.

The original 12′ of the copying machine system is either arranged on a platen (not shown) such that the document 12′ presents a curved surface to the sensing optics or, in the alternative, the original document is caused to move in a plane tangent to the platen and perpendicular to the scan line 12′*a*. Scanning of the original document 12′ in the former case is accomplished by use of a horizontal scan mirror 32 which receives sensing light from the flat field scan lens 30. Rotational apparatus 34 is used for operating the horizontal scan mirror 32 such that a scan of the original document is accomplished in a predetermined sequence. In the latter case, the platen need not be curved and the rotational apparatus 34 and the scan mirror 32 are not required. It is therefore within the contemplation of the present invention that a flat platen is useful with an original document in a flat orientation if either the paper is moving or if complex motion of the horizontal scan mirror 32 is imparted by conventional means known in the art, thereby providing two-dimensional flat field correction.

The reflected light from the original document 12′ is propagated back to the multi-sided mirror 28 and then to the light sensor 38 such that a signal is conducted by electrical conduction means 46 to a laser device 18′ as shown in FIG. 2. The laser device 18′ produces a modulated laser beam 16′ for propagation through beam expanding optics 40 to a fold mirror 42 of conventional design. The fold mirror 42 reflects the laser output to the multi-sided mirror 28 and particularly to one of the mirror faces 28b thereof. Light is then reflected through a flat field scan lens 20′ to a fixed mirror 44. The fixed mirror 44 reflects light from the scan lens 20 to moving copy paper 22. The copy paper 22 is constructed in accordance with the previous description relative to FIG. 3, that is, the copy paper 22 includes a substrate 22*a* and a coating 22*b* such that the coating 22*b* is selectively vaporized by the laser beam 16′ at an exposure location through which the copy paper is moving to render the copy paper 22 selectively retentive to electrostatic toner. More specifically, the system includes a negative shield 50 located adjacent to the conductive coating of recording medium 22 and a positive shield 52 located adjacent to the substrate portion of the copy paper 22. The shields 50, 52 define therebetween an exposure location through which the copy paper 22 moves and a corona charge is applied through the shields from a source of corona charge 54.

In this way, a negative charge is applied to the exposed surface of coating 22*b* and a positive charge is applied to the undersurface of copy paper 22 in the orientation of FIG. 2. The corona charge is thus conducted away in all areas of the paper 22 where the coating 22*b* remains after laser vaporization. On the other hand, since the substrate 22*a* is not conductive (a dielectric), a subsequent toner bath will cause toner particles to adhere in only those areas where the substrate has been exposed by vaporization of the coating. Such areas where toner particles adhere correspond to darker areas of the original.

By use of a system in accordance with FIGS. 1 or 2, a laser beam removes coating 22*b* in accordance with darker segments of the information of an original document. For instance, as shown in FIGS. 4 and 4A, if the original document bears the letter L, darker with respect to its background, then coating 22*b* is removed in selected areas by such means as those shown in FIGS. 1 and 2 to control the laser beam. The letter L is thereby formed on the copy paper 22 in terms of exposure of the substrate 22*a* by vaporization of the coating 22*b* upon which the laser beam has impinged. The letter L shown in FIGS. 4 and 4A may be formed by the vaporization of the coating 22*b* such that the letter has sides perpendicular to the substrate 22*a* or such that the coating 22*b* is removed with a curved surface forming the side of the letter, the curved surface extending from the outside edge 23 of the letter L and through the coating to the center line 25. Accordingly, a cupped-shaped image is formed if there is deemed to be a necessity to compensate for spreading when toner is applied according to the method of the present invention.

Referring specifically to FIGS. 5 through 7 the method of the present invention is shown as including the steps of scanning areas of a conductively coated paper with a laser beam as shown in FIGS. 1 and 2, charging the conductively coated and scanned paper by means of corona source 54 and thereafter applying toner 56' by means of a toner source 56. The application of the toner source may be accomplished in a variety of ways such as by use of a toner bath or by application of an electrostatic toner in the same manner as ink may be applied by use of an inked plate and a rate table.

As shown particularly in FIG. 7, the removed area of the conductive coating is substantially replaced by toner 56' providing the darker areas of the copy image. The toner may be dried by conventional means such as by heating or the like or roll-dried, also by conventional means.

Also contemplated by the present invention is a recording system and method analogous to that described above wherein the coating 22*b* includes darker material with properties as described above and the substrate 22*a* includes white material having the properties previously described. The laser beam scans the coated paper and removes the darker coating in response to the lighter segments of the information of the original. Such an approach simplifies the electronics associated with the sensing unit 10 and modulator 14. The scanned paper is then subjected to a source of white toner or ink which adheres to the areas of the copy paper 22 where the coating 22*b* has been removed by the laser beam.

What is claimed is:

1. A recording system for reproducing information from an information source onto an information-receiving medium comprising means for scanning said information source, an information-receiving medium having a non-conductive substrate and a vaporizable coating for said substrate on at least one surface thereof, a source of laser energy, means for directing an output beam from said laser source to areas of said coating selected in accordance with said scanned information, means for scanning said selected areas of said coating, said beam being of a wavelength and of sufficient intensity to vaporize said coating and expose said substrate in said selected areas, means for applying a corona charge to said medium and means for applying toner to said medium, said toner adhering to said substrate where said coating has been removed.

2. The invention according to claim 1 wherein said means for directing includes means for sensing information from said information source and a laser modulator, whereby said laser modulator modulates said source of laser energy to direct said output beam to selected areas of said coating in accordance with lighter segments of the information of said information source.

3. The invention according to claim 1 wherein said means for directing includes means for sensing information from said information source and a laser modulator, whereby said laser modulator modulates said source of laser energy to direct said output beam to selected areas of said coating in accordance with darker segments of the information of said information source.

4. The invention according to claim 3 wherein said means for sensing includes a light source, lens means, and a light sensor, whereby said light source propagates light to said information source and said light is propagated from said information source through said lens to said light sensor.

5. The invention according to claim 4 wherein said system further comprises means for connecting said source of laser energy with said light sensor, said sensor thereby controlling said source of laser energy.

6. A recording system for reproducing information from an information-original document onto a recording medium comprising means for scanning said information source, a source of laser energy, means for moving said medium through an exposure location, means for directing an output beam from said laser source to selected areas of said medium at said exposure location in accordance with said scanned information, means for scanning said selected areas of of said medium, said medium comprising a non-conductive substrate and a vaporizable coating for said substrate on at least one surface of said medium, said beam being of a wavelength and having an intensity to vaporize the coating on said selected areas of said medium, means for applying a corona charge to said surface after said vaporization by said beam and means for applying toner to said medium.

7. A method for recording information from an original information source onto a recording medium having a non-conductive substrate and a vaporizable coating by use of a controlled laser beam comprising the steps of:

a. scanning said original information source to form an electrical signal to modulate said laser beam;
b. controlling said beam in accordance with said information to thereby vaporize selected areas of said coating;
c. scanning said selected areas of said coating;
d. applying a corona charge to said medium; and
e. thereafter applying toner to said medium.

8. The method of claim 7 comprising the additional step of drying said toner.

9. The method of claim 7 wherein said step of applying toner is provided by immersing said medium in a toner bath.

* * * * *